United States Patent [19]

Malinski et al.

[11] Patent Number: 4,616,528
[45] Date of Patent: Oct. 14, 1986

[54] VALVE ACTUATOR WITH CONTINUOUS MANUAL OVERRIDE

[75] Inventors: Richard F. Malinski, Schaumburg; John Sikorcin, St. Charles, both of Ill.

[73] Assignee: Vapor Corporation, Chicago, Ill.

[21] Appl. No.: 374,382

[22] Filed: May 3, 1982

[51] Int. Cl.[4] .............................................. F16H 1/32
[52] U.S. Cl. ..................................... 74/626; 251/249.5
[58] Field of Search ........................... 74/626, 569, 54; 251/249.5, 286, 288; 137/556, 556.3

[56] References Cited

U.S. PATENT DOCUMENTS

| | | | |
|---|---|---|---|
| 2,030,150 | 2/1936 | Mueller | 251/285 |
| 2,300,576 | 11/1942 | Klein | 74/626 X |
| 2,453,949 | 11/1948 | Ulinski | 74/626 X |
| 2,583,140 | 1/1952 | Else | 74/626 X |
| 2,621,541 | 12/1952 | Rath | 74/626 |
| 2,957,357 | 10/1960 | Stockwell | 74/569 X |
| 3,851,538 | 12/1974 | Denkowski et al. | 74/425 |
| 4,063,710 | 12/1977 | Minami et al. | 251/248 |
| 4,089,347 | 5/1978 | Christo | 251/285 X |
| 4,093,180 | 6/1978 | Strabala | 251/248 |
| 4,261,224 | 4/1981 | Sulzer | 74/626 |
| 4,346,728 | 8/1982 | Sulzer | 251/249.5 X |
| 4,397,642 | 8/1983 | Lamadrid | 251/249.5 X |
| 4,423,752 | 1/1984 | Psarouthakis | 251/288 X |

FOREIGN PATENT DOCUMENTS

| | | |
|---|---|---|
| 2133237 | 1/1973 | Fed. Rep. of Germany ... 251/249.5 |
| 2543988 | 4/1977 | Fed. Rep. of Germany ........ 74/569 |
| 2727293 | 12/1978 | Fed. Rep. of Germany ... 251/249.5 |

Primary Examiner—Kenneth J. Dorner
Assistant Examiner—Dwight G. Diehl
Attorney, Agent, or Firm—Francis J. Lidd

[57] ABSTRACT

A valve actuator with manual override includes an input shaft for receiving input torque. The input shaft drives an epicyclic gear train sun gear and in turn is motor driven through a non-reversible gear set. The sun gear is in driving engagement with first, second and third planetary gears that in turn engage a first ring gear. Secured to each of the first, second and third planetary gears are fourth, fifth and sixth planetary gears. A second epicyclic ring gear engages the fourth, fifth and sixth planetary gears and is secured to an output shaft that in turn is secured to a valve shaft. The first ring gear engages a worm gear that may be manually actuated to operate the driven valve. The worm gear is slideably mounted on a shaft and biased by springs such that when the output shaft reaches a limit of rotation, or excessive load torque is applied, axial movement is transferred to the worm gear. Limit switches can be located about the shaft and are actuated by the worm gear due to a predetermined amount of axial movement. Adjustable stops are provided on the output shaft to limit rotary movement of the driven shaft over a selected 90° or 180° nominal range. An integral output shaft position indicator may be provided adjacent the output shaft, operating independently of any functional devices such as limit switches.

12 Claims, 9 Drawing Figures

VALVE ACTUATOR WITH CONTINUOUS MANUAL OVERRIDE

BACKGROUND OF THE INVENTION

A. Field of the Invention

The present invention relates to a new and improved valve actuator with manual override.

B. Description of the Prior Art

Typical valve actuators that include a manual override and torque limit provision employ a clutch mechanism between the manual override and the valve actuator. Alternative actuators require actual disengagement of the actuator from the valve and manual operation of the valve stem, assuming the stem is accessible to actuate the valve manually. Typical prior art valves and actuators are, however, manufactured in a manner such that manual operation of the driving apparatus is difficult to deform due to limited accessibility. It is therefore highly desirable that a manual override capability be provided in a valve actuator wherein the input need not be disengaged nor a complex clutch mechanism required.

Some prior art actuators provide manual drive of an epicyclic gear train adjacent to a power source or driven input. In this construction, due to the high gear ratio of the succeeding actuator train, it is necessary to use an additional "step up" gear to provide any reasonable hand-wheel operation. In other prior art actuators, an epicyclic train is driven by a prime mover through a spur gear set. With this construction, manual actuation of any part of the epicyclic train will produce reverse rotation of the drive motor and hence requires an auxiliary motor brake or other additional braking means. Another prior art actuator is disclosed in U.S. Pat. No. 4,261,224.

The actuator disclosed hereinafter overcomes these disadvantages through the use of selectably irreversible input drive gear sets, and manual actuation of an epicyclic train very near to the output shaft.

SUMMARY OF THE INVENTION

An object of the present invention is to provide a new and improved actuator including a continuously available manual override.

Another object of the present invention is to provide a new and improved valve actuator that employs an epicyclic gear set.

A further object of the present invention is to provide a new and improved valve actuator with a continuously available manual override that also functions to actuate limit switches upon the attainment of a predetermined torque limit.

An additional object of the present invention is to provide a new and improved valve actuator with a continuously available manual override that allows manual actuation of the valve either aiding or opposing the driven output during the operation of the input drive to the valve actuator.

It is an additional object of this invention to provide a new and improved valve actuator utilizing an epicyclic gear train having a manual input to the epicyclic train adjacent to the output shaft.

It is an additional object of this invention to provide a new and improved valve actuator utilizing an epicyclic train having continuous manual actuation of a portion of the epicyclic train and requiring no auxiliary brake on the input or prime mover.

It is yet a further object of this invention to provide a new and improved valve actuator utilizing an epicyclic gear train in continuous manual drive wherein step-up gearing the manual input is not required, but adaptable if desired.

It is still a further object of this invention to provide an improved valve actuator that includes common adjustable stops that limit rotary movement of the driven valve shaft to a selected 90° or 180° nominal range.

It is still a further object of this invention to provide a new and improved valve actuator having direct indication of the output shaft location integrated with the output shaft.

The present invention is directed to a new and improved valve actuator with a continuous manual override. The actuator includes a housing with a manual input shaft extending therefrom. Coupled to the input shaft within the housing is an epicyclic gear set defined by coupled planetary gears symmetrically journaled in the valve actuator. Surrounding the planetary gears are first and second ring gears. An output shaft is secured to the second ring gear and a manually actuated worm gear is in driving engagement with the first ring gear.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DETAILED DESCRIPTION OF THE PREFERRED EMBODIMENT

Figure 1:
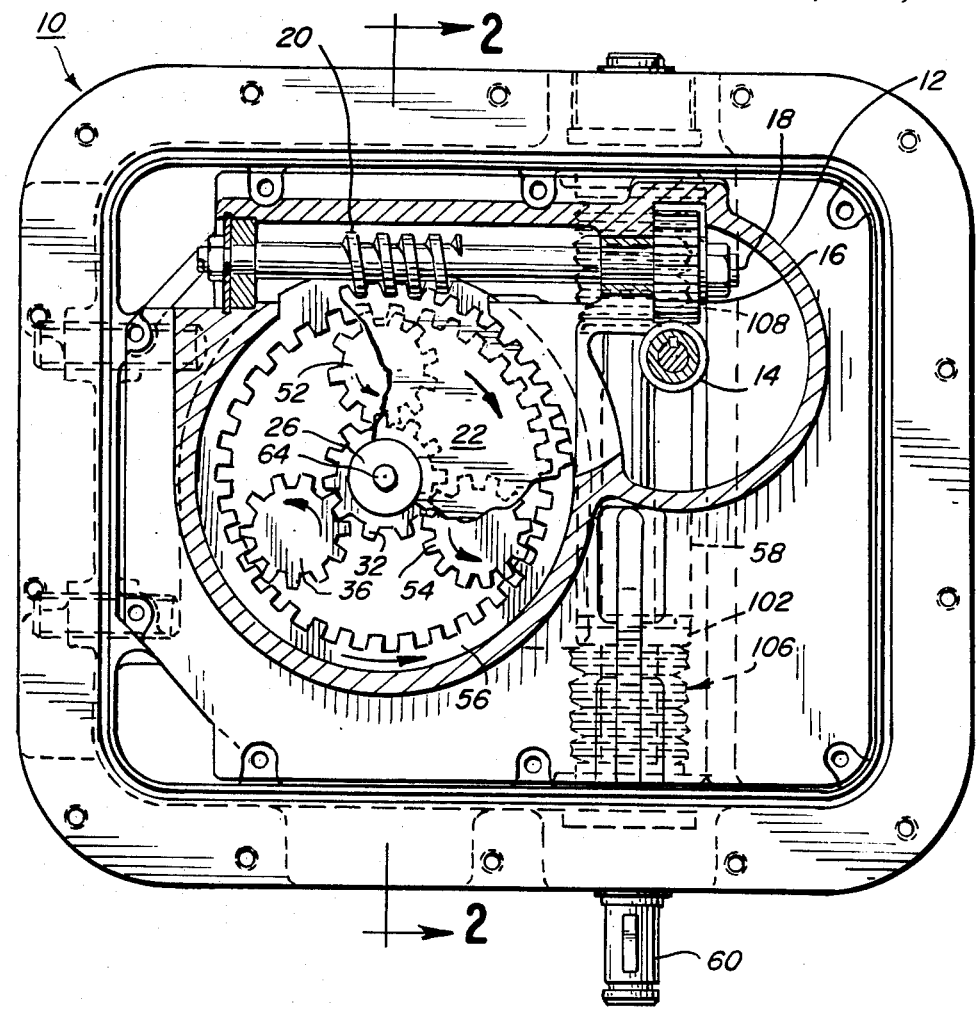
FIG. 1 is a plan view of a valve actuator, with cover removed, constructed in accordance with the principles of the present invention.

Having reference now to the drawings, there is illustrated a valve actuator generally designated by the reference numeral 10 that includes a continuous manual override. The valve actuator 10 transmits torque to a load such as a valve stem to actuate the valve in a desired direction. In addition, a continuously available manual override allows an individual to manually actuate the valve during operation by an electric motor. This unique safety related feature is provided, as will be described herein, by direct mechanical connection of the manual override through a compound epicyclic gear set, thus eliminating the need for clutches or similar manual drive disconnect mechanisms.

An additional advantage provided by the disclosed structure is the easy gear change provided by the accessibility of the gear set 14, 16, 20 & 22 that provides a mechanical input signal. The gears 20 & 22 are easily changed or replaced in the field, allowing the actuator 10 to change output shaft rotation speed and therefore accommodate a wide range of driven valves. As those skilled in the art will readily realize, modulating valves, particularly the butterfly designs, present an actuator with substantial dynamic forces caused by the fluids controlled. The combination disclosed provides necessary reaction through predetermined combinations of epicyclic gear sets without the necessity for an auxiliary prime mover brake.

Figure 2:
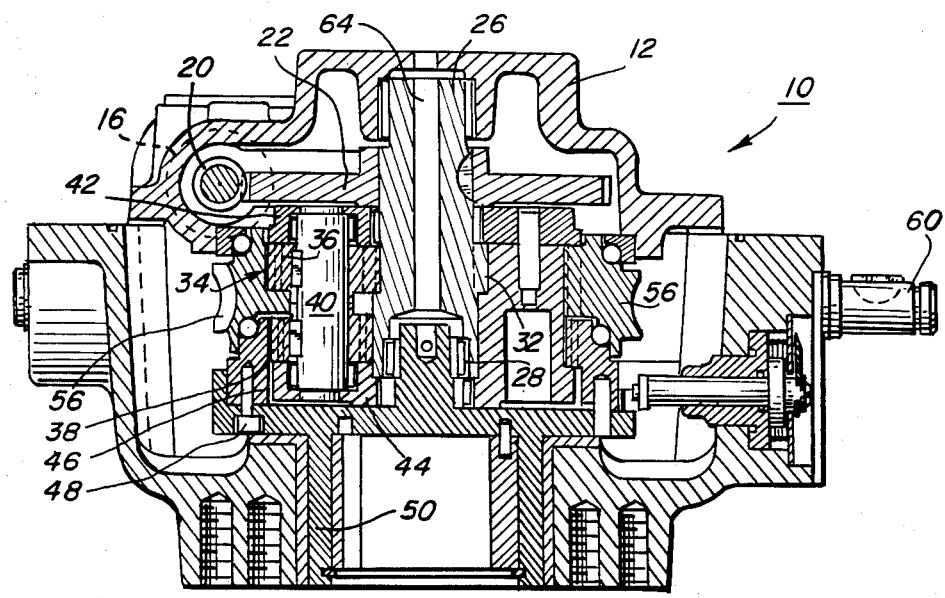
FIG. 2 is taken along line 2—2 of FIG. 1.

Turning now to FIGS. 1 and 2, the actuator 10 is illustrated as mounted in a housing 12 to protect the actuator 10 from the environment and to serve as a mounting structure. Input torque from a drive motor is mechanically coupled to the actuator 10 and this signal may be in the form of rotational energy provided by a motor or the like intended to actuate a valve. The mechanical input signal in the embodiment illustrated is provided by the gear set including gear 14 that engages a gear 16 mounted on a shaft 18. The shaft 18 is rotatably mounted in the housing 12 and includes the gear 20 defined thereon that engages the teeth of an input worm gear 22 secured to the shaft 26. The shaft 26 is journaled in the housing 12 and is rotated in response to the input imparted by the worm gear 20 through the gear 22.

The gear shaft 26 includes a bearing 28 and a sun gear designated by the reference number 32 defined thereon. Mounted adjacent to the gear shaft 26 and in engagement with the sun gear 32 is a first planetary gear set generally designated by the reference numeral 34 that includes a first, upper planet gear 36 and a lower planet gear 38 coupled together by a planet gear shaft 40. The shaft 40 is journaled at the upper end by a carrier plate 42 and its lower end by the carrier 44. The upper planetary gear 36 engages and is rotated by the sun gears 32 whereas the lower planetary gear 38 engages an output gear or ring gear 46. The output gear 46 is connected by pins 48 to the output shaft 50 that may be coupled to the valve that is to be actuated by the actuator 10.

Figure 3:
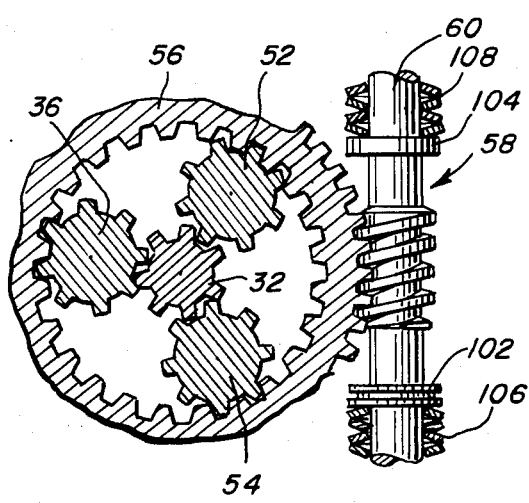
FIG. 3 is a top diagrammatic illustration of the device of the present invention in a static position.
Figure 4:
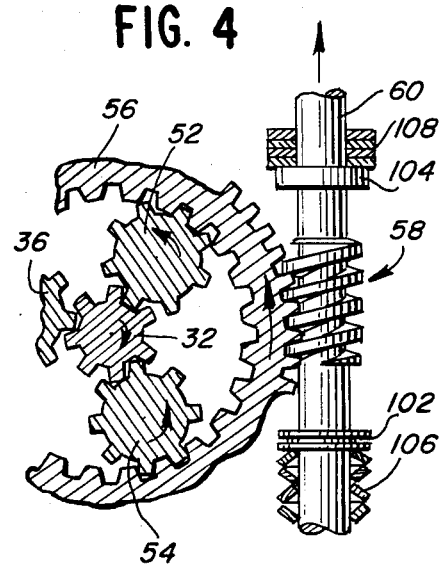
FIG. 4 is a view similar to FIG. 3 in a valve actuation position, but it must be understood that valve actuation can be accomplished at any radial orientation of the shaft.

In a similar manner, the remaining planet gear sets are best illustrated in FIGS. 3 and 4 and designated by the numerals 52 and 54. The gear sets 52 and 54 include upper and lower planetary gears joined by shafts the same as gear set 34. Each upper gear 36 engages and is driven by the sun gear 32 and each lower gear 38 engages and drives the output gear 46. The planetary gear sets 34, 52 and 54 are spaced approximately 120° apart. The planetary gear 36 also engages manual drive gear or ring gear 56 that is actuated or rotated by the worm gear 58 secured to the shaft 60.

An electrical switch cam shaft may be journaled in an opening 64 in shaft 26 and fixedly mounted in output member 50. The shaft 46 will then turn with output member 50 and may be employed to indicate the position or the extent of actuation by the actuator 10, or be used to mount a cam type device for operating limit switches and/or other desired associated equipment.

A feature of the structure 10 disclosed in an integrally contained communicator of shaft output that operates independently of a shaft in the opening 64. As illustrated (FIG. 6), output member 50 incorporates a cam surface 66 cooperating with a cam follower 73 (FIG. 5) contained in indicator assembly 70. Also, a part of the indicator assembly 70 is a rotary member 72 and valve case adapter 74 to allow mounting of the assembly 70 onto the housing 12. Also utilized, reference FIGS. 7 and 8, is a cam follower spring 76 that provides torsional force on the follower 73, thus insuring continuous contact with the cam surface 66 of member 50.

Figure 5:
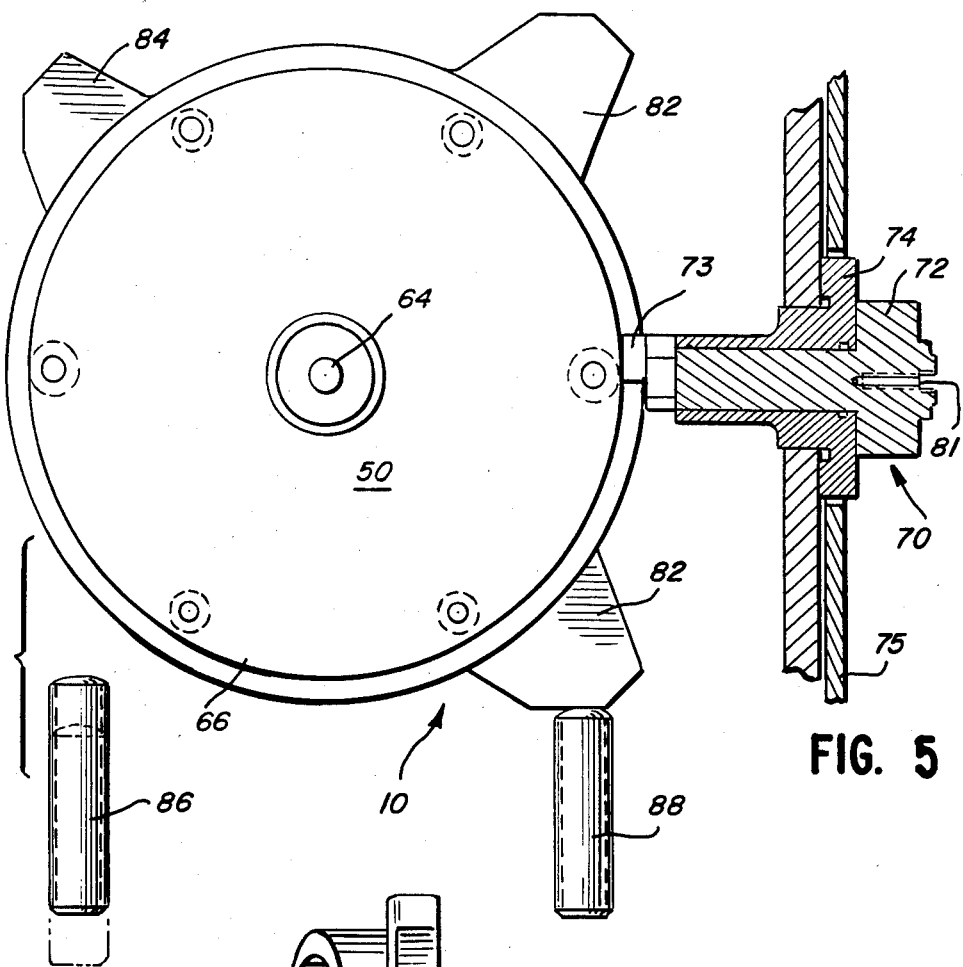
FIG. 5 is a partial plan and section view from a location opposite to that of FIG. 1, particularly showing output shaft stops, adjustable stop screws, and output shaft position indicator in partial section.
Figure 6:
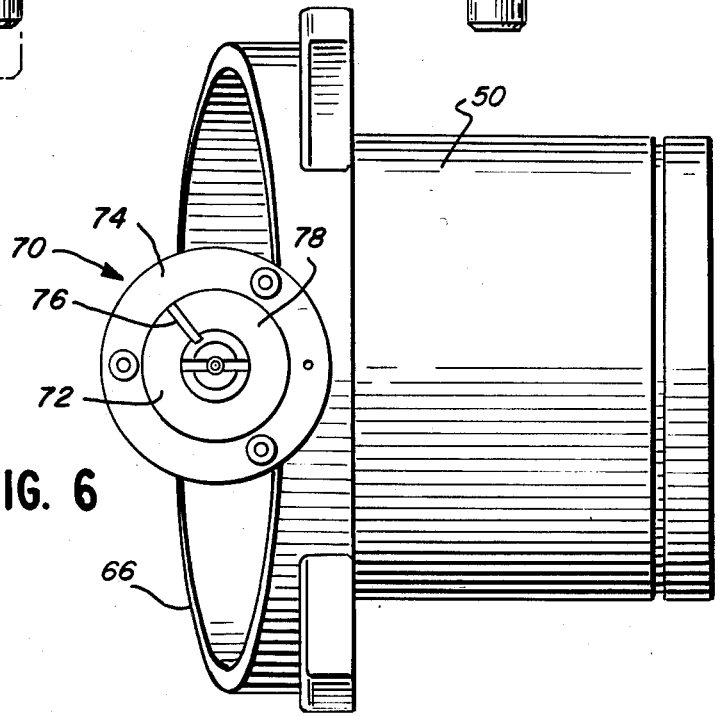
FIG. 6 is a partial side view of the valve actuator, particularly showing the output shaft position indicator, and operating cam on the output shaft.
Figure 7:
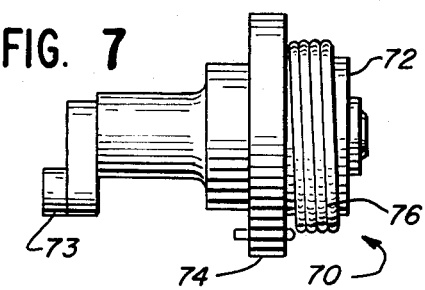
FIG. 7 is a side view of the output shaft position indicator, the rotor, with operating cam attached and indicator with spring in position.
Figure 8:
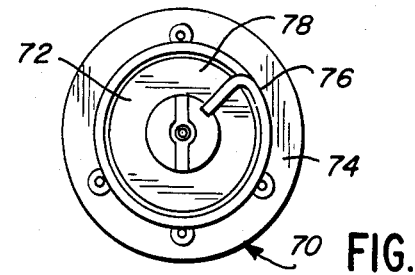
FIG. 8 is an end view of the indicator as installed particularly showing the mounting means for the indicator spring.
Figure 9:
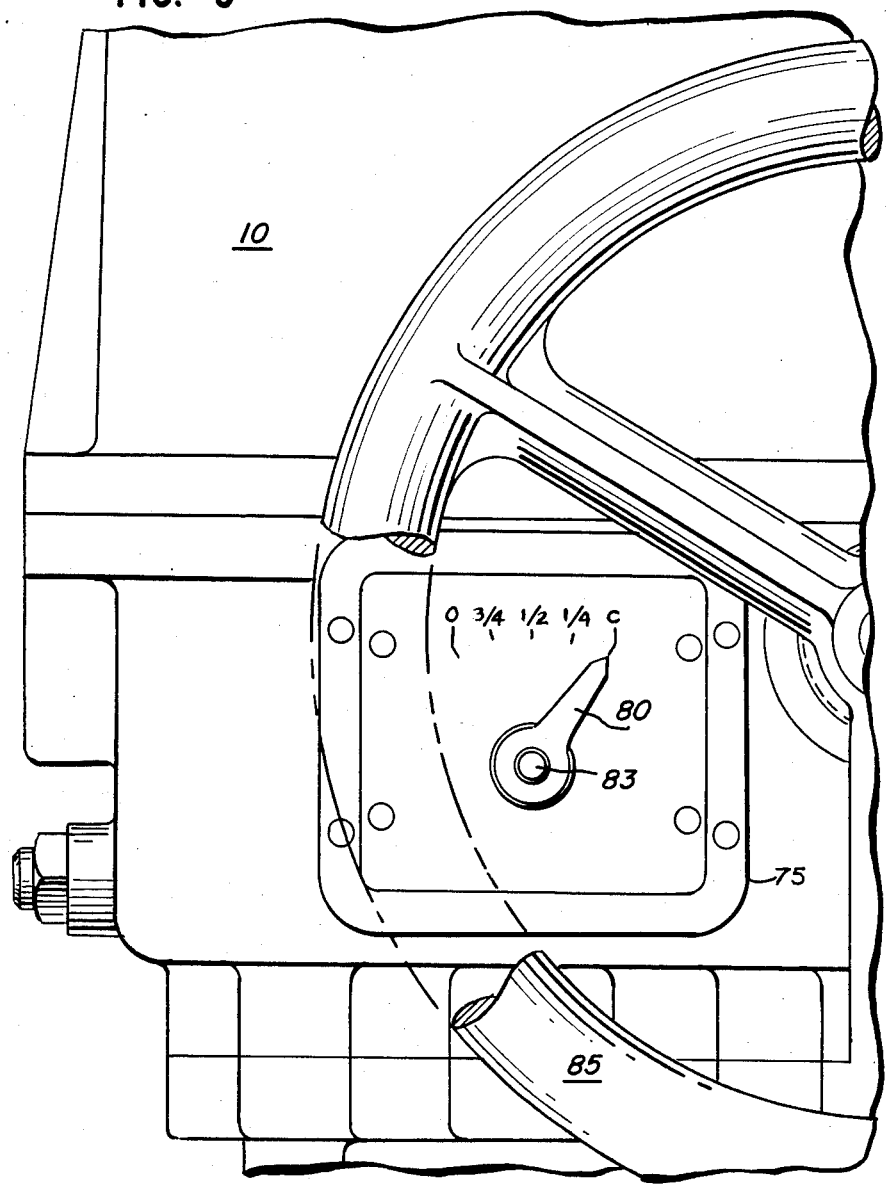
FIG. 9 is a view of a typical operator utilizing the invention in particular showing the location of the valve position indicator.

The indicator assembly 70 is assembled as indicated in FIGS. 7 and 8 and mounted on the adapter 74 as indicated in FIG. 5, with a pointer 80 (FIG. 9) that indicates shaft rotary orientation, on a valve indicator plate 75 that is mounted on shaft 81 mounted in an aperture 83 defined in the rotary member 72. Rotation of the output member 50, now in contact with the cam follower 73, results in turning rotary member 72 a predescribed number of degrees for each degree of valve travel as transmitted by member 50. This rotation results in positioning the indicator 80 along the predetermined locations on the indicator plate 75 providing an accurate, independent indication of valve output shaft position.

In reference to FIG. 5, a particular feature of the invention is the incorporation of similar adjustable stops, provided to limit rotary movement of the output shaft to a predetermined 90° or 180° nominal range, as desired. This is accomplished through the use of lugs 82 and 84, on output member 50. It should be noted that lug 84 is substantially shorter in radius than lugs 82. Cooperating with the lugs are adjustment screws 86 and 88.

In operation, with screw 86 in its most extended position as shown, valve operation is limited in the counter clockwise direction by screw 86 and lug 84. In the clockwise direction, valve operation is limited by screw 88 as shown in lug 82. If in a particular situation it becomes necessary to operate the valve output shaft in the 180° nominal range sector determined solely by both lugs 82, it is only necessary to retract screw 86 so that lug 84 has clearance. This feature is necessary in applications such as three position operation of multi-port valves, diverting, or blending.

The structure described above operates in the following manner. Rotational or torsional input is imparted to the input shaft 26 through gears 14, 16, 20 and 22. Gears 34, 52 and 54 are rotated and track within the ring gear 56 and the planetary gears 38 secured to the planetary gears 34, 52 and 54 by the shaft 40 and similar shafts (not shown) track within output gear 46. The ring gear 56 is prevented from rotating through its engagement with the manual override worm gear 58. The worm gear 58 is defined on the shaft 60 that is slideably mounted within predetermined travel limits in the housing 12. Positioned between the worm gear 58 and lands or retainer washers 102 and 104 are belleville spring washers 106 and 108 retained within the housing 12 as shown in FIG. 1; thereby biasing the worm gear 58 to a predetermined position best illustrated in FIG. 3. Since the ring gear 56 is prevented from rotating during the rotation of the shaft 26, the gears 34, 52 and 54 and the planetary gears 38 and the others (not shown) track around the inner periphery of the ring gears 46 and 56. The differential rotation resulting from this tracking is transmitted to the ring gear 46 causing rotation thereof and thus rotation of the output member 50. The rotation of member 50 functions to actuate the valve.

Upon rotation of the valve to its travel limit or upon locking due to malfunction or the like, the relative motion between output shaft 50 and the housing 12 terminates and additional torque is created. This torque is transmitted through the gears 34, 52 and 54 to the ring gear 56 and thus to the worm gear 58 resulting in the shaft 60 moving axially within the housing 12 against the bias of the belleville washers 108. Upon predetermined compression of one of the belleville washer sets 108 (see, for example, FIG. 4), a limit switch (not shown) is actuated by axial motion of shaft 60, thereby terminating the input to the actuator 10 and also terminating valve rotation and preventing damage.

If at any time a change in rate of the actuation is desired or the operator of the actuator 10 desires to actuate the valve manually, the manual override worm 58 may be rotated. The worm 58 is mounted within the actuator housing 12 such that the operator may reach the worm 58 with handwheel 85 or a similar device, to rotate the worm 58 to advance or reverse the action, thus actuating the valve in the direction desired.

Manual rotation introduced by shaft 60 and worm 58 apply torques to the output member 50 and axial force to gear set 22 and 20. If the set 20-22 should allow reverse rotation of itself, manual valve operation would be dependent on the ratio between valve actuating force and the torque required for reverse driving the prime mover. As in many cases, however, the prime mover requires little torque to be reverse operated, and under these conditions, manual valve actuation would not be possible. However, a particular feature of the invention disclosed is the utilization of selected self-locking gear ratios for 22 and 20 so that reliable and consistent manual valve actuation is achieved without additional brakes or selection of prime movers for high reverse torque characteristics.

Therefore, the override function performed through the worm 58 is also performed through the gears 34, 52 and 54 thus taking advantage of both inputs from the shaft 26 and from the worm 58 to provide a single output. In addition, this override procedure can be accomplished, if desired, with the motor drive continuously applied to the actuator 10 to either aid or oppose the driven output. In this way, a relatively inexpensive, safe, convenient and reliable method of manual valve operation without the use of clutches or other mechanical devices to selectively isolate the manual shaft is provided.

The above-described drive structure utilizes sets of first and second planetary gears linked together by shafts thereby providing straight through reduction between the input shaft 26 and the output shaft 50, while at the same time providing a continuous manual drive at an intermediate speed through the gear 58. In addition, the symmetrical arrangement of the internal gear reduction set of the actuator 10 described above provides for containment of all gear separation forces within the planetary system. These features are in contrast to arrangements for containing the unbalanced gear separation forces generated in prior art structures. The present construction described above is advantageous in that over the life of the actuator 10, wear does not result in complete failure of the actuator 10 due to internal gear lockup resulting from gear tooth wear and/or tolerance build up. With the present construction described above, the adverse effects due to normal wear are cancelled, thereby maintaining proper actuator operation.

Many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. A valve actuator with continuously available manual override comprising;
   a housing;
   an input shaft journaled in said housing;
   first worm gear set mechanically coupled between said input shaft and input signal means;
   an epicyclic sun gear mounted on said input shaft;
   first, second and third planetary gears in driven engagement with said sun gears being spaced approximately 120° from each other;
   a first ring gear in engagement with and surrounding said first, second and third planetary gears;
   an output member;
   gear means engaging said output member and first ring gear;
   manual override means engaging said sun gear for actuating said sun gear; and
   means axially securing first, second and third planetary gears to said fourth, fifth and sixth planetary gears, respectively.

2. The valve actuator claimed in claim 1 wherein said gear means includes a second ring gear in engagement with and surrounding said fourth, fifth, and sixth planetary gears.

3. The valve actuator claimed in claim 2 wherein said first worm gear set incorporates a non-reversible gear ratio.

4. The valve actuator claimed in claim 3 wherein said manual override means comprises a second worm gear.

5. The valve actuator claimed in claim 4 further comprising a housing wherein said second worm gear is slideably mounted on said housing and includes means for load biasing said worm gear to a predetermined position.

6. The valve actuator claimed in claim 1 further comprising first, second and third lug stops defined on said output member and movable engagement members secured to said housing for engaging said first, second and third lug stops.

7. The valve actuator claimed in claim 1 further comprising an inclined cam surface defined on said output member, and a follower engaging said inclined surface.

8. A valve actuator with manual override comprising:
   an actuator housing;
   an input shaft rotatably mounted in said housing;
   a worm gear set mechanically coupled to said input shaft for transmitting an input signal thereto;
   a sun gear secured to said input shaft;
   first, second and third planetary gears spaced approximately 120° from each other in driven engagement with said sun gear;
   fourth, fifth and sixth planetary gears secured to said first, second and third planetary gears, respectively;
   a second ring gear engaging said fourth, fifth, and sixth gears;
   an output member secured to said second ring gear and adjustable means for limiting rotary movement of the actuator and valve including at least one lug stop on said output member and an engagement member for engaging said lug stop.

9. The actuator set forth in claim 8 further comprising a first ring gear engaging said first, second and third planetary gears.

10. The actuator set forth in claim 8 further comprising a manual override including a second worm gear slideably mounted on said housing engaging said first ring gear.

11. The actuator set forth in claim 10 further comprising means load biasing said second worm gear to a preselected position.

12. The actuator set forth in claim 8 further comprising means for indicating the rotary position of said output member, said indicating means including an inclined surface defined on said output member and a follower engaging said inclined surface.

* * * * *

UNITED STATES PATENT AND TRADEMARK OFFICE
CERTIFICATE OF CORRECTION

PATENT NO. : 4,616,528

DATED : October 14, 1986

INVENTOR(S) : Richard F. Malinski et al

It is certified that error appears in the above-identified patent and that said Letters Patent are hereby corrected as shown below:

Col. 1, line 20, change "deform" to -- perform --;

Col. 2, line 6, after "gearing" insert -- of --;

Col. 4, line 64, after "the" (first instance) insert -- input --;

Col. 5, line 1, change "The" to -- This --.

Signed and Sealed this

Eighth Day of December, 1987

Attest:

DONALD J. QUIGG

Attesting Officer

Commissioner of Patents and Trademarks